United States Patent [19]

Nagamine et al.

[11] Patent Number: 4,937,422
[45] Date of Patent: Jun. 26, 1990

[54] METHOD OF CORRECTING LASER OUTPUT POWER

[75] Inventors: Tsuyoshi Nagamine; Etsuo Yamazaki; Mitsuo Kinoshita, all of Hachioji; Nobuaki Iehisa, Minamitsuru, all of Japan

[73] Assignee: Fanuc Ltd, Minamitsuru, Japan

[21] Appl. No.: 320,303

[22] PCT Filed: Jul. 12, 1988

[86] PCT No.: PCT/JP88/00695
§ 371 Date: Mar. 2, 1989
§ 102(e) Date: Mar. 2, 1989

[87] PCT Pub. No.: WO89/00778
PCT Pub. Date: Jan. 26, 1989

[30] Foreign Application Priority Data
Jul. 13, 1987 [JP] Japan .................. 62-174338

[51] Int. Cl.⁵ .............................. B23K 26/00
[52] U.S. Cl. .................. 219/121.61; 219/121.62; 219/121.83; 364/474.08
[58] Field of Search ............ 219/121.68, 121.69, 219/121.67, 121.72, 121.63, 121.64, 121.61, 121.62, 121.83; 364/474.08

[56] References Cited

U.S. PATENT DOCUMENTS 3,700,850 10/1972 Lumley et al. ............ 219/121.69
4,087,672 5/1978 Yi ............................... 219/121.62 X
4,504,727 3/1985 Melcher et al. ............. 219/121.62
4,730,113 3/1988 Edwards et al. ........... 219/121.83 X
4,812,641 3/1989 Oritiz, Jr. ................... 219/121.62 X

FOREIGN PATENT DOCUMENTS 0016691 1/1984 Japan ........................... 219/121.62

Primary Examiner—C. L. Albritton
Attorney, Agent, or Firm—Staas & Halsey

[57] ABSTRACT

There is disclosed a method of correcting the laser beam output power of an NC laser beam cutting machine composed of a computerized numerical control (CNC) apparatus and a laser beam cutting machine. When a laser is initially energized, a correcting coefficient is determined from a laser beam output power command value and an actual laser beam output power by a correcting means (11), and the actual laser beam output power is measured at each periodic interval of time by an output measuring device (33). The NC laser beam cutting machine is controlled by a command control means (13) to eliminate the difference between the laser beam output power command value and the actual laser beam output power. When the laser is initially energized, a long-term variation in the laser beam output power is corrected, and when an actual cutting operation is carried out, a short-term variation in the laser beam output power is corrected, so that the laser output power can be produced accurately.

7 Claims, 2 Drawing Sheets

ID OF CORRECTING LASER OUTPUT POWER

DESCRIPTION

1. Technical Field of the Invention

The present invention relates to a method of correcting the laser output power of a CNC laser beam cutting machine, and more particularly to a laser beam output correcting method capable of automatically compensating for a time-dependent change in the output power of a laser beam.

2. Description of the Background Art

Laser beam cutting machines are being widely used since they may be coupled to numerical control apparatus for cutting workpieces to complex contour at a high speed. For higher cutting accuracy on a laser beam cutting machine, it is necessary to control the output power of a laser beam produced by the laser beam cutting machine. Actually, the output power of a laser beam varies with time because of varying distances between mirrors, varying angles of the mirrors, a loss of a high-frequency power supply, contamination of optical parts such as the mirrors, and other factors. The laser beam output power also varies for seasonal reasons, such as ambient air temperature and the like, and further varies with time dependent on varying ambient air temperature, varying laser gas temperature, and the like. Therefore, the laser beam output power tends to deviate from a certain output command value.

Japanese Patent Application No. 62-107823 filed by the applicant discloses an arrangement for compensating for such time-dependent changes of a laser beam output power. According to the disclosed arrangement, command values and actual laser beam output values corresponding thereto are determined, a table of such command values and actual laser beam output values is prepared, and a command value for obtaining a required laser beam output power is produced from the table, and issued as a command.

With the above method, however, in order to compensate for a time-dependent variation in the output power of a laser beam, the table must be changed by measuring the laser beam output power at certain intervals of time. Unless such a table changing process were effected, no accurate laser beam output power would be achieved. Moreover, such a table changing process is very difficult to carry out since the table has to be changed after the cutting machine has bee delivered to a user. The disclosed correcting operation cannot compensate for short-term variations in the laser beam output power.

SUMMARY OF THE INVENTION

It is an object of the present invention to provide a laser beam output correcting method which will solve the aforesaid problems and which is capable of automatically correcting long- and short-term variations in the output power of a laser beam.

To solve the above problems, there is provided in accordance with a first embodiment of the invention a method of correcting the laser beam output power of a CNC laser beam cutting machine composed of a computerized numerical control (CNC) apparatus and a laser beam cutting machine, comprising the steps of:

measuring an actual laser beam output power with an output measuring device with respect to a laser beam output power command value when a laser is initially energized;

determining a correcting coefficient from said laser beam output power command value and said actual laser beam output power; and controlling the CNC laser beam cutting machine to produce a laser beam output power equal to the command value by referring to the correcting coefficient in an actual cutting operation.

According to a second embodiment invention, there is provided a method of correcting the laser beam output power of a CNC laser beam cutting machine composed of a computerized numerical control (CNC) apparatus and a laser beam cutting machine, comprising the steps of:

measuring an actual laser beam output power at each periodic interval of time with respect to a laser beam output power command value; and controlling the CNC laser beam cutting machine to eliminate the difference between said laser beam output power command value and said actual laser beam output power.

According to a third embodiment of the invention, there is provided a method of correcting the laser beam output power of a CNC laser beam cutting machine composed of a computerized numerical control (CNC) apparatus and a laser beam cutting machine, comprising the steps of:

measuring an actual laser beam output power with an output measuring device with respect to a laser beam output power command value when a laser is initially energized;

determining a correcting coefficient from said laser beam output power command value and said actual laser beam output power;

correcting said laser beam output power command value to produce a laser beam output power equal to the command value by referring to the correcting coefficient in an actual cutting operation;

measuring the actual laser beam output power at each periodic interval of time with an output measuring device; and controlling the CNC laser beam cutting machine to eliminate the difference between said corrected laser beam output power command value and said actual laser beam output power.

According to the first embodiment of the invention, when the laser is initially energized, the command value is issued and measured, and the correcting coefficient is determined from the command value and the laser output power. When the cutting operation is carried out, the command value is corrected by the correcting coefficient to produce a laser output power according to the command value.

According to the second embodiment of the invention, the laser output power is measured at each periodic interval of time, and the difference between the command value and the laser output value is determined. The laser output power is controlled to eliminate the difference.

According to the third embodiment of the invention, when the laser is initially energized, the command value is issued and measured, and the correcting coefficient is determined from the command value and the laser output power. When the cutting operation is carried out, the command value is corrected by the correcting coefficient. During the actual cutting operation, the laser output power is measured at each periodic interval of time, and the laser output power is controlled to eliminate the difference between the corrected command value and the laser beam output power.

DESCRIPTION OF THE PREFERRED EMBODIMENT

An embodiment of the present invention will hereinafter be described with reference to the drawings.

Figure 1:
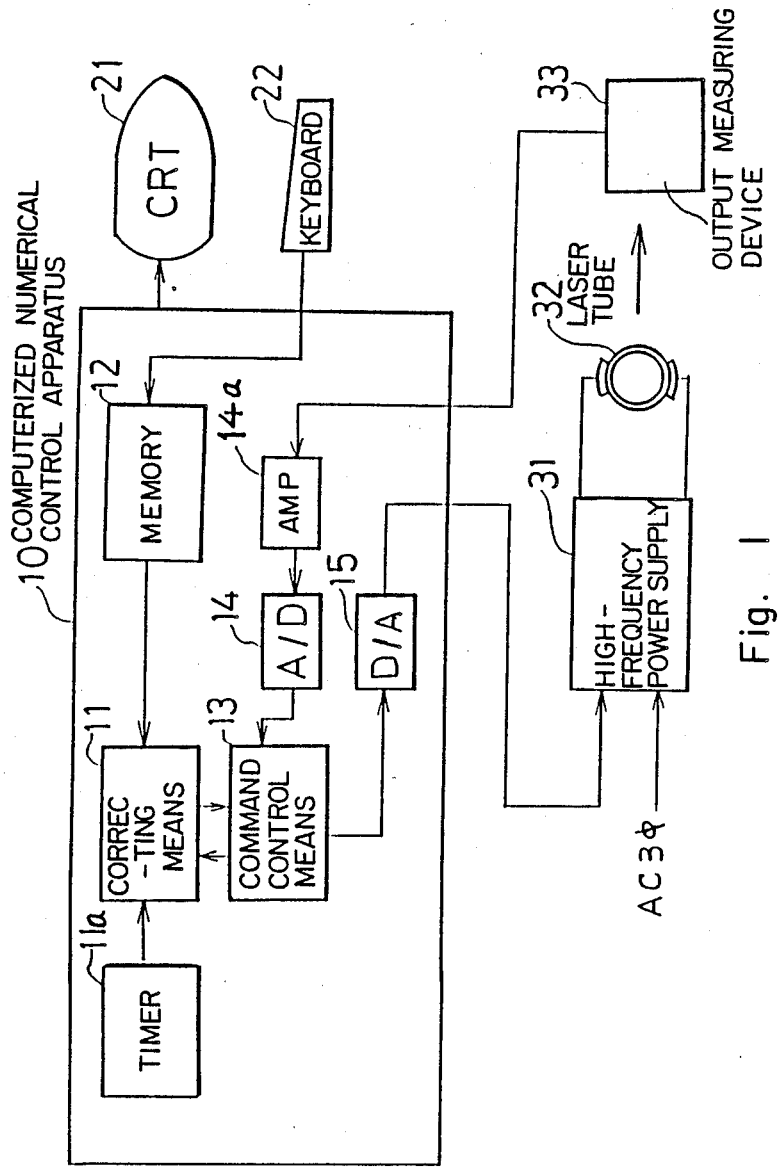
FIG. 1 is a block diagram of a system for carrying out a method according to an embodiment of the present invention.

FIG. 1 shows in block form a system for carrying out a method according to an embodiment of the present invention. The system includes a computerized numerical control (CNC) apparatus 10 for controlling a laser beam cutting machine. The CNC apparatus 10 includes a correcting means 11 for calculating a correcting coefficient from a command value and an actual laser beam output power. The correcting means 11 has an internal memory for storing the calculated correcting coefficient. A procedure of determining a correcting coefficient will be described later on. The CNC apparatus 10 also has a timer 11a for giving a necessary time to the correcting means 11, and a memory 12 for storing various command values such as of a distance to move, a speed, an output power, a duty factor, and the like for laser beam cutting operation.

A command control means 13 refers to a correcting coefficient calculated by the correcting means 11 with respect to a command value for a laser beam output power, and issues a corresponding command value. An A/D converter 14 converts the measured value of a laser beam output power to a digital value, and delivers the digital value to the command control means 13. An amplifier 14a amplifies the measured value of the laser beam output power. A D/A converter 15 converts the digital command value from the command control means 13 to an analog value, and issues the analog value.

A display 21 comprising a display unit such as a CRT, a liquid crystal display, or the like displays a machine position, a speed, cutting conditions, and the like. A keyboard 22 is used to enter a command value for the laser beam cutting machine, various data, parameters, and the like.

A high-frequency power supply 31 rectifies three-phase alternating currents into a DC output, converts the DC voltage to a high-frequency voltage with an inverter, and supplies the high-frequency voltage to a laser tube 32. The laser tube 32 effects a high-frequency discharge to oscillate and amplify a laser beam in response to the application of high-frequency electric power supplied from the high-frequency power supply 31. The output power of the laser beam is measured by a output measuring device 33. More specifically, the laser beam emitted from the laser tube 32 is partly passed through a rear mirror and applied to a thermodisc, for example and a temperature rise of the thermodisc which is caused by the application of the laser beam is converted to a voltage for measuring the output power of the laser beam. The laser beam which has been passed through the rear mirror may directly be converted photoelectrically to provide a voltage output.

The correcting means for calculating a correcting coefficient will be described below. After the power supply has been turned on, the number of discharge tube segments to be used is determined, and the laser oscillating device is put into a cutting mode. Such a process is referred to as the initial energization of the laser. A correcting coefficient is determined each time the laser is initially energized.

Figure 2:
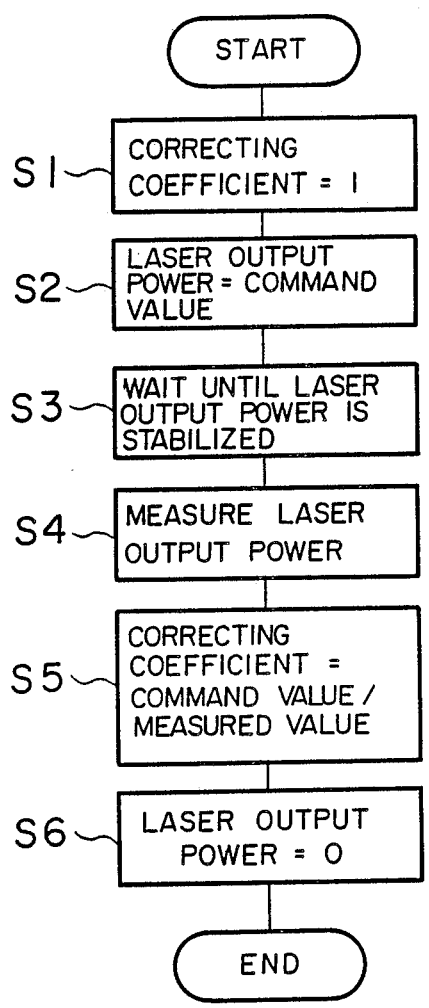
FIG. 2 is a flowchart of an operation sequence for determining a correcting coefficient.

FIG. 2 shows a flowchart of an operation sequence for determining a correcting coefficient. The numbers following the letter "S" in FIG. 2 represent step numbers.

[S1] A correcting coefficient is set to "1".

[S2] A laser output power command value is commanded. For example, a command value of 500 W is commanded.

[S3] The operation sequence is suspended for about few seconds until the laser beam output power is stabilized.

[S4] The laser beam output power is measured by the output measuring device 33. It is assumed here that the output power of 480 W is measured.

[S5] A correcting coefficient is calculated by the correcting means 11.

Correcting coefficient=command value/measured value=500/480≈1.04

The calculated correcting coefficient is stored in the memory in the correcting means 11.

[S6]The laser beam output power is reduced to "0".

Correcting coefficients are successively determined according to the numbers of discharge tube segments to be used. Since correcting coefficients differ dependent on the value of a laser beam output power, they are determined also according to laser beam output powers. For example, correcting coefficients may be determined in respective command value ranges of 0 to 250 W, 251 W to 500 W, 501 W to 750 W,...

The correcting means 11 is arranged such that a correcting coefficient can automatically be determined when the laser oscillating device is initialized, e.g., when an HVON (high voltage on) button on control panel is depressed. As a result, time-dependent variations in the laser beam output power can automatically be compensated for without requiring the operator to be concerned about the procedure for determining the correcting coefficient.

In an actually cutting process, a numerical value produced by multiplying a command value by a correcting coefficient is used as an actual command value. Accurate laser beam output power can thus be obtained at all times.

If a correcting coefficient becomes very large, then it may be considered that the laser oscillating device is malfunctioning rather than a time-dependent variation in the laser beam output power. Therefore, a certain limit value is provided, and when the correcting coefficient is in excess of a limit value of 1.2, for example, (or is smaller than 0.8, for example), an alarm indication is displayed on the display 21, the laser beam output is turned off, and an operation such as an interlocking operation is effected so that no laser beam output is turned on even if the turn-on button is depressed. The limit value may be of an appropriate value selected in view of the scale of the laser beam cutting machine and safety requirements.

While the correction of long-term time-dependent variations in the laser beam output power has been described above, short-term time-dependent output power variations due to a change in the ambient temperature, a change in the laser gas temperature, a change in the laser gas pressure, and the like cannot be compensated for by the above method. Correction of short-term laser beam output power variations will now be described below.

The laser beam output power is measured by the output measuring device 33 at a certain periodic interval of time, and the correcting means 11 controls the laser beam output power so that the difference between a measured value and a command value will be zero. The time is determined by the timer 11a, and largely depends upon a measuring element employed in the output measuring device 33.

When the difference between the command value and the measured output value becomes larger than a predetermined value, an alarm indication is displayed on the display 21, the laser beam output is turned off, and an operation such as an interlocking operation is effected so that no laser beam output is turned on even if the turn-on button is depressed. Since the laser beam output power may vary only in a short period of time and immediately return to a normal value, the above alarm indication is displayed only if the difference in excess of a predetermined value is continued for more than a certain period of time.

Efficient correction of long- and short-term variations in the laser beam output power will be described below. Theoretically, the laser beam output power can be of a command value by correcting short-term output power variations. Actually, however, because the response time of the laser control system includes a considerably long response time of the high-frequency power supply 31, a considerably long response time of the output measuring device 33, and the like, the correcting gain cannot be increased to a substantial level. Therefore, when the laser is initially energized, a correcting coefficient for correcting a long-term variation in the laser beam output power is determined to correct the command value. In actual cutting operation, the corrected command value is commanded, a command value which is corrected at a certain periodic interval of time is compared with a laser beam output value, and correcting operation is controlled so that the difference between the compared command and output values becomes zero. In this manner, the amount of short-term correction is rendered small, making the laser control system stable.

With the present invention, as described above, when the laser is initially energized, an actual laser beam output power is measured, a correcting coefficient is determined, and a command value is corrected by the correcting coefficient in an actual cutting operation. Therefore, an accurate laser beam output power can be produced even if the laser power is subjected to time-dependent variations.

During a cutting operation, a command value and a measured output value are compared at each predetermined periodic interval of time, and the difference between the compared values is eliminated. Accordingly, an accurate laser beam output power can be produced at all times.

Moreover, when the laser is initially energized, a time-dependent output power variation is corrected, and the corrected value and the output power value are compared and the difference therebetween is eliminated while an actual cutting operation is being carried out. The laser beam output power can consequently be corrected accurately while the laser control system is being maintained stably.

We claim:
1. A method of correcting the laser beam output power of a CNC laser beam cutting machine composed of a computerized numerical control (CNC) apparatus and a laser beam cutting machine, comprising the steps of:
measuring an actual laser beam output power with an output measuring device with respect to a laser beam output power command value when a laser is initially energized;
determining a correcting coefficient from said laser beam output power command value and said actual laser beam output power; and
controlling the CNC laser beam cutting machine to produce a laser beam output power equal to the command value by referring to the correcting coefficient in an actual cutting operation.

2. A method according to claim 1, wherein a plurality of correcting coefficients are employed with respect to the respective numbers of laser tubes to be used.

3. A method according to claim 1, wherein said correcting coefficient is determined for each of ranges of laser beam output power command values.

4. A method according to claim 1, wherein an alarm indication is displayed and operation of the CNC laser beam cutting machine is stopped when said correcting coefficient exceeds a limit value.

5. A method of correcting the laser beam output power of a CNC laser beam cutting machine composed of a computerized numerical control (CNC) apparatus and a laser beam cutting machine, comprising the steps of:
measuring an actual laser beam output power at each periodic interval of time with respect to a laser beam output power command value; and
controlling the CNC laser beam cutting machine to eliminate the difference between said laser beam output power command value and said actual laser beam output power.

6. A method according to claim 5, wherein an alarm indication is displayed and operation of the CNC laser beam cutting machine is stopped when said difference exceeds a predetermined value with respect to said laser beam output power command value.

7. A method of correcting the laser beam output power of a CNC laser beam cutting machine composed of a computerized numerical control (CNC) apparatus and a laser beam cutting machine, comprising the steps of:
measuring an actual laser beam output power with an output measuring device with respect to a laser beam output power command value when a laser is initially energized;
determining a correcting coefficient from said laser beam output power command value and said actual laser beam output power;
correcting said laser beam output power command value to produce a laser beam output power equal to the command value by referring to the correcting coefficient in an actual cutting operation;
measuring the actual laser beam output power at each periodic interval of time with an output measuring device; and
controlling the CNC laser beam cutting machine to eliminate the difference between said corrected laser beam output power command value and said actual laser beam output power.

* * * * *